Sept. 17, 1968     J. SCHUBERT ETAL     3,401,525
SOLID FUEL MOUNTING FOR ROCKET ENGINE
Filed Oct. 11, 1966
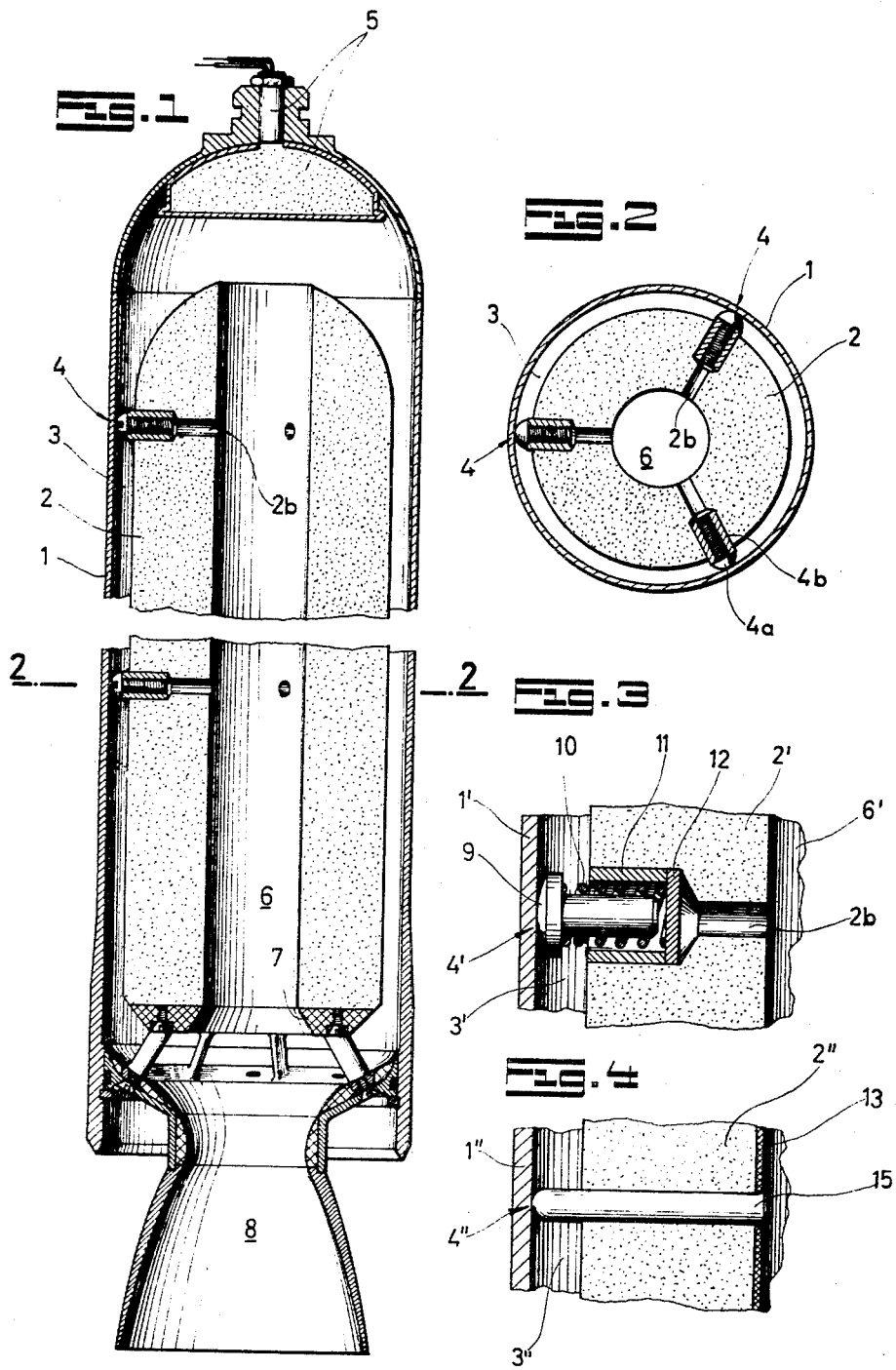
INVENTORS
Wilhelm Wessel
Johannes Schubert
By *MurlFlow and Toren*
ATTORNEYS United States Patent Office 3,401,525
Patented Sept. 17, 1968

3,401,525
SOLID FUEL MOUNTING FOR
ROCKET ENGINE
Johannes Schubert and Wilhelm Wessel, Munich, Germany, assignors to Bolkow Gesellschaft mit beschrankter Haftung, Munich, Germany
Filed Oct. 11, 1966, Ser. No. 585,970
Claims priority, application Germany, Oct. 23, 1965,
B 84,233
9 Claims. (Cl. 60—255)

ABSTRACT OF THE DISCLOSURE

An arrangement for supporting a solid propellant charge within the combustion chamber of a rocket engine includes support elements having inner ends which are located entirely within the propellant charge and embedded within the material thereof and outer ends which bear against the interior walls of the combustion chamber in order to support the propellant charge centrally within the combustion chamber at a spaced location from a combustion chamber wall. The support elements are located at a plurality of uniformly spaced locations extending around the periphery of the charge and they are made of a material having thermal expansion characteristics similar to the propellant charge composition but being of substantially lower combustion velocity. They are embedded in the composition at a depth to maintain engagement with any remaining portion of the composition during substantially the whole combustion life thereof.

Summary of the invention

This invention relates, in general, to the construction of rocket engines and, in particular, to a new and useful solid fuel rocket engine having a tubular propellant charge or a propellant charge which may be burned from the outer circumference toward the inside and to improved means for supporting the charge within the combustion chamber.

As the thrust capabilities of the solid fuel rockets increase, it becomes increasingly important for the solid propellant charge to be constructed and arranged such that it will absorb higher stresses during the higher accelerations to which they become subject. With the conventional oblong dimensions of the solid fuel compositions the strength of the compositions are not sufficient to absorb transverse and buckling loads satisfactorily. Because of this, there is a tendency for the composition to sag which can lead to irregular combustion due to variations in the gap between the combustion and the interior wall of the combustion chamber and also to control difficulties. In many cases, cracks are formed by overstress which causes increased burning surfaces and an uncontrollable thrust increase due to the increased evolution of gas. In the majority of the cases, the cracks lead to an explosion of the propulsive unit.

Attempts have been made to overcome the above disadvantages by providing additional supports for the solid fuel propellant within the combustion chamber. Such supports have taken the form of formations on the charge itself or additional supporting elements such as bars, grates, supporting corrugation elements, etc. A disadvantage with the support members known heretofore is that they interfered with the flow characteristics of the thrust gases and in some instances produced forces which increased the danger of buckling. In addition, they have not been satisfactory for the purpose of maintaining the propellant charge in a concentric position within the combustion chamber during the progressive combustion thereof. A further disadvantage is that the supports cause the narrowing of the free cross section in the tubular burner so that the ignition is disturbed and the gas passage area is considerably reduced. A further disadvantage is that the supporting devices which were known heretofore provide an unduly large increase in the weight of the combustion chamber and thus reduce the payload.

In accordance with the invention, there is provided a support for the propellant charge composition which is arranged to hold the composition laterally centered within the interior of the combustion chamber and to prevent any lateral movement. In accordance with the invention, support means are provided which are imbedded in the composition and extend outwardly therefrom to engage the interior of the combustion wall chamber. In the preferred arrangement, the supports are imbedded in the solid fuel compositions up to the entire wall thickness in the case where the composition burns with external combustion only. In those cases where the charge is arranged to burn with both internal and external combustion, the support elements are imbedded into the wall of the charge up to one half the wall thickness of the latter or to an appropriate distance so that engagement of the support will be maintained during the burning inwardly and outwardly of the charge up to the point of the inner end of the supporting device. In the preferred arrangement, the supporting elements consist of a material having similar thermal expansion characteristics, but which will burn at substantially lower combustion velocity than the solid fuel combustion composition.

In one embodiment of the invention, the support means include threaded sleeve elements which are imbedded within the composition and bolt members which are threaded into the sleeve members and which extend outwardly from the members into engagement with the interior wall of the combustion chamber or a reversal of these parts. In some instances, it is desirable to provide for differences of the radial thermal expansion between the solid fuel charge and the support means in respect to the combustion chamber wall. When such a condition must be accounted for, the support means will include at least some support elements which include an element which is biased outwardly from the propellant charge to engage the combustion chamber wall. Such supporting devices advantageously include socket elements which are imbedded in the charge and which include spring members which bias bolt members which may move into and out of the socket. With a construction of this nature, the bolt members are arranged to move outwardly during the burning of the charge to maintain engagement with the combustion chamber walls and to absorb differences of radial expansion by resiliently bearing against the combustion chamber wall and to ensure the concentric mounting of the propellent charge composition. With such a construction, high punctform stresses are also avoided.

Accordingly, it is an object of the invention to provide an improved solid fuel rocket engine having means for supporting a propellent charge in a position such that it may burn from the outside and be maintained substantially concentrically within the chamber during its burning.

A further object of the invention is to provide a combustion chamber including a cylindrical interior wall with a propellent charge which burns from the outside surface inwardly or which is of a tubular configuration and which may burn either from the outside surface or the inside surface and with support means imbedded in the propellent charge to a thickness to provide centering means for the charge during its combusion life.

A further object of the invention is to provide means for mounting a propellent charge within a combustion chamber which includes a plurality of support elements imbedded in the combustion charge composition and extending outwardly therefrom to engage a wall of the combustion chamber, the elements being imbedded to an extent to maintain a centering action on the charge during the combustion life thereof.

A further object of the invention is to provide a supporting means for a propellent charge which includes means resiliently engaged with the interior of the wall of the combustion chamber and urging the propellent charge centrally within the combustion chamber.

A further object of the invention is to provide a solid fuel combustion chamber and a means for supporting the charge therein which are simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings in which there are illustrated and described preferred embodiments of the invention.

In the drawings:

FIG. 1 is a longitudinal sectional view through a solid fuel rocket engine with supporting means for the solid fuel charge constructed in accordance with the invention;

FIG. 2 is a section taken on the lines 2—2 of FIG. 1;

FIG. 3 is a partial sectional view similar to FIG. 1 of another embodiment of the invention; and FIG. 4 is a view similar to FIG. 3 of still a further embodiment of the invention.

Referring to the drawings, in particular, the invention as embodied therein in FIGS. 1 and 2 comprises a solid fuel rocket engine having a tubular charge or tubular propellent composition 2. The tubular propellent charge 2 is arranged within the cylindrical combustion chamber 3 defined at the interior of the cylindrical housing 1. The rocket engine includes an upper end which carries an ignition device 5. The tubular propellent charge 2 is supported on an annular grate 7 and the burning gases which are generated by the burning of the propellent charge 2 will move downwardly along the annular space between the charge and the interior walls of the combustion chamber and also through the central cylindrical space 6 at the center of the propellent charge and they will exit through the nozzle 8.

In accordance with the invention, the propellent charge 2 is supported within the combustion chamber in a concentric manner by support means generally designated 4. In the embodiment of FIGS. 1 and 2, the support means 4 comprises a first part 4a which comprises a threaded bolt which is threaded into a second part or sleeve 4b. In the arrangement indicated, the sleeve 4b is inserted into the propellent charge 2 and the bolt member 4a is threaded outwardly to engage the inner wall of the combustion chamber 3 preferably at symmetrically arranged circumferential locations. The internally threaded sleeve 4b is advantageously arranged so that its bore communicates with a bore 2b which is defined in the propellent charge 2 and extends to the central cylindrical tubular space 6. By adjusting the screws 4a, it is possible without maintaining narrow manufacturing tolerances to adapt the position of the propellent charge composition 2 to any annular gap dimension between the charge and the interior wall of the combustion chamber. Minor positional changes of the location of the charge 2 may be easily effected by rotating the bolt members 4a in the sleeves 4b.

In the arrangement indicated, the supports 4 are located at least at two separate locations in the propellent charge 2 and they are advantageously arranged at 120° spacings to perform the symmetrical three-point suspensions indicated.

In the embodiment indicated in FIG. 3, there is provided a support generally designated 4' which comprises a socket made up of an annular sleeve 11 and an inner end plate 12 which are embedded in the propellent charge composition 2'. The support 4' also includes a bolt member or biased member 9 which is urged outwardly into contact with the interior wall of the combustion chamber 3' by means of a spring 10 which is disposed around the bolt member and held within the socket formed by the cylindrical member 11 and plate 12. The supports 4' are advantageously made sufficiently heat resistant so that they will not deteriorate upon combustion of the propellent charge. The outward biasing of the bolt member insures that the load increase during combustion will be limited to substantially lower forces as determined by the spring characteristic.

In the embodiment indicated in FIG. 4, there is shown a support 4" which includes a propellent charge 2" having an internal layer of heat insulating material which forms a heat damming layer and prevents internal combustion at such location. In this embodiment, the support means comprises only a simple bolt or pin member 15 which is secured to the heat damming wall 13 and extends outwardly therefrom and through the propellent charge 2" to engage the interior wall of the combustion chamber wall 3".

The supporting means, 4, 4' and 4" in the various embodiments will act to transmit the acceleration forces which act transversely or eccentrically per unit of mass and length, respectively, and to transmit to the combustion chamber wall the forces representing the pressure differences which can act on the various burning surfaces due to irregular combustion. In this manner, the shearing forces are cancelled and the cross section is relieved of stress by the bending moments, particularly those in the proximity of the axial mounting. In order to ensure that the radial forces whose direction is not known are always transmitted as compressive forces to the outer wall, at least three supports as shown in FIG. 2 should be uniformly distributed over the circumference.

In order to be able to absorb the forces during the entire combustion period, each supporting element is rigidly connected with the associated charge such as by cementing in a manner to ensure that it is retained therewith during the combustion period. In this manner, the combustion charge is maintained centrally within the combustion chamber even during the burning of the last portion of the charge so that the radial forces can be transmitted to the walls of the combustion chamber. In tube burners of the type indicated in FIGS. 1 and 2, where uniform combustion velocity may be obtained from burning on both the inside and the outside, it suffices to secure the supporting element in the composition only up to half the annular cross section. When combustion materials of different rates are used, then the position of the support is correspondingly adjusted.

In the preferred arrangement, the support members 4, 4' and 4" are formed of a material having sufficient stability in respect to the occurring combustion temperatures and a material suitable for this, for example, will be ethyl cellulose or celon.

Compressive stresses and buckling stresses due to suppressed thermal expansion in an axial direction are voided in the unilateral mounting of the composition on the grate 7. The supporting elements are advantageously designed so that they can slide along the combustion chamber wall.

While specific embodiments of the invention have been shown and described in detail to illustrate the application of the inventive principles, it will be understood that the invention may be embodied otherwise without departing from such principles.

What is claimed is:

1. A solid fuel rocket engine comprising wall means defining a tubular combustion chamber, a solid fuel propellant composition in said combustion chamber, and a support for centering said propellant composition in said combustion chamber having an inner end entirely covered by and firmly embedded in said composition and an outer end extending outwardly from said composition at uniformly spaced locations around the periphery thereof into bearing engagement with said wall means, said support means being of a material having thermal expansion characteristics similar to that composition but being of substantially lower combustion velocity, said support means being embedded in said composition to a depth to maintain engagement with any remaining portion thereof during substantially the whole combustion life of said composition.

2. A solid fuel rocket engine, according to claim 1, wherein said support means includes a bolt member and means for biasing said bolt member outwardly to engage said wall means.

3. A solid fuel rocket engine, according to claim 1, wherein said solid fuel propellent composition is of tubular configuration.

4. A solid fuel rocket engine, according to claim 1, wherein said propellent charge is of tubular configuration and includes an outer wall formed of said solid fuel propellent composition and an interior tubular wall of heat insulating material, said support means being secured to said interior tubular wall.

5. A solid fuel rocket engine, according to claim 4, wherein said support means comprises a pin secured to said interior tubular wall and extending through said solid fuel composition into engagement with said wall means.

6. A solid fuel rocket engine, according to claim 1, including a nozzle discharge formed at one end of said tubular combustion chamber, an annular grate supported in said combustion chamber above said nozzle, said solid fuel propellent composition being supported on said annular grate against axial displacement.

7. A solid fuel rocket engine, according to claim 1, wherein said solid fuel propellant composition is a tube and includes a propellant charge having uniform combustion characteristics from the interior of said tube to the exterior and from the exterior toward said interior, said support means including a sleeve member embedded in said charge up to substantially half of the annular cross section thereof, a bolt having a head portion engaged against said combustion chamber and a shank portion extending into said sleeve, and a spring disposed around said shank portion between said sleeve member and said head portion biasing said head portion against said combustion chamber wall.

8. A solid fuel rocket engine, according to claim 7, wherein said propellent charge is provided with a plurality of bores defined therein, said support means being imbedded in each of said bores up to a depth at which engagement with said propellent charge will be maintained during combustion, the remaining portion of the bores being opened to the center of said charge.

9. A solid fuel rocket engine comprising wall means defining a tubular combustion chamber, a solid fuel propellant composition in said combustion chamber and support means embedded in said composition and extending outwardly therefrom at uniformly spaced locations around the peripherty thereof into bearing engagement with said wall means, said support means being of a material having thermal expansion characteristics similar to said composition but being of substantially lower combustion velocity and being embedded in said composition to a depth to maintain engagement with any remaining portion thereof during substantially the whole combustion life of said composition, said support means comprising a threaded sleeve member, and a bolt member threaded into said sleeve and being threadable to adjust its position to engage the interior of said wall means.

References Cited
UNITED STATES PATENTS

| | | | |
|---|---|---|---|
| 2,748,702 | 6/1956 | Sawyer | 60—255 |
| 2,781,633 | 2/1957 | Rodgers et al. | 60—255 |
| 2,923,126 | 2/1960 | Precoul | 60—255 |
| 2,956,401 | 10/1960 | Kane | 60—39.47 XR |
| 3,090,196 | 5/1963 | Brewer | 60—255 |

FOREIGN PATENTS

| | | |
|---|---|---|
| 406,209 | 10/1943 | Italy. |

CARLTON R. CROYLE, *Primary Examiner.*